United States Patent
Koyama et al.

(10) Patent No.: US 6,626,652 B2
(45) Date of Patent: Sep. 30, 2003

(54) MOTOR-DRIVEN COMPRESSORS AND METHODS OF ASSEMBLING MOTOR-DRIVEN COMPRESSORS

(75) Inventors: Shigeyuki Koyama, Isesaki (JP); Satoru Saito, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/102,913

(22) Filed: Mar. 22, 2002

(65) Prior Publication Data

US 2002/0146335 A1 Oct. 10, 2002

(30) Foreign Application Priority Data

Nov. 15, 2001 (JP) ..................... P2001-349795
Apr. 9, 2001 (JP) ..................... P2001-109368

(51) Int. Cl.$^7$ .................. F04B 17/00; F04B 49/00; F25D 23/12
(52) U.S. Cl. .................. 417/423.1; 417/42; 62/259.2; 439/884
(58) Field of Search .................. 417/423.1, 44.1, 417/42, 423.7, 423.14; 439/884; 62/259.2, 505

(56) References Cited

U.S. PATENT DOCUMENTS 4,252,394 A * 2/1981 Miller .................. 439/566
5,053,664 A * 10/1991 Kikuta et al. .................. 417/423.7
6,321,563 B1 * 11/2001 Ikeda et al. .................. 62/505
6,501,662 B2 * 12/2002 Ikeda .................. 361/760
6,560,984 B2 * 5/2003 Bellet .................. 62/259.2

* cited by examiner

Primary Examiner—Charles G. Freay
Assistant Examiner—Michael K. Gray
(74) Attorney, Agent, or Firm—Baker Botts L.L.P.

(57) ABSTRACT

A motor-driven compressor includes a motor and a compression portion for compressing a refrigerant. The motor-driven compressor comprises an input terminal for the motor and a drive circuit for controlling a rotation speed of the motor. The input terminal of the motor passes through an opening formed through a wall of a refrigerant suction route, whereby the input terminal is secured to the wall, and extends beyond the wall. The drive circuit controls the rotation speed of the motor and has an output connector. The output connector of the drive circuit is connected directly to the input terminal to secure the drive circuit to the wall. The direct connection eliminates a need for a wire connection between the output connector and the input terminal. Moreover, methods of assembling motor-driven compressors are disclosed.

17 Claims, 2 Drawing Sheets

MOTOR-DRIVEN COMPRESSORS AND METHODS OF ASSEMBLING MOTOR-DRIVEN COMPRESSORS

BACKGROUND OF THE INVENTION

1. Field of the Invention

The present invention relates to motor-driven compressors that include a motor and a compression portion for compressing a refrigerant, and more particularly, to motor-driven compressors that are suitable for use in air conditioning systems of vehicles.

2. Description of Related Art

Motor-driven compressors are driven by a power source, e.g., an external power source, such as a battery. Such motor-driven compressors including a compression portion and a motor for compressing refrigerant are known in the art. In such known motor-driven compressors, as shown in FIG. 1, an inverter 11 of a drive circuit controls the power supply to the motor, thereby controlling the rotation speed of the motor. Inverter 11 is positioned on an exterior portion of a housing 12 of the motor-driven compressor. Electric power is supplied to inverter 11 via a pair of cables 13. Each of a plurality of output terminals 14 is connected to one of a plurality of terminals 15, respectively. Each output terminal 14 is connected to a respective terminal 15 via a first wire 18. Each terminal 15 is connected to an input terminal of the motor (not shown) via a second wire 17. Moreover, inverter 11 is fixed to the exterior of housing 12 of the motor-driven compressor by a plurality of bolts 19.

In such known motor-driven compressors, a loss of power may occur at wires 17 and 18, thereby increasing the electric power consumption of the motor-driven compressor without increasing the output of the motor-driven compressor. Moreover, the number of components required for the above-described structure of drive circuits of known motor-driven compressors may increase the cost and time of manufacturing such compressors.

SUMMARY OF THE INVENTION

A need has arisen for motor-driven compressors, in which a loss of power from an electric power supply is reduced when compared with known motor-driven compressors.

A further need has arisen for motor-driven compressors with a reduced number of components when compared with known motor-driven compressors.

In an embodiment of the invention, a motor-driven compressor includes a motor and a compression portion for compressing a refrigerant. The motor-driven compressor comprises an input terminal for the motor and a drive circuit for controlling a rotation speed of the motor. The input terminal for the motor passes through an opening formed through a wall of a refrigerant suction route, whereby the input terminal is secured to the wall, and extends beyond the wall. The drive circuit controls the rotation speed of the motor and has an output connector. The output connector of the drive circuit is connected directly to the input terminal, thereby securing the drive circuit to the wall.

In a further embodiment of the invention, a motor-driven compressor comprises an input connector for a motor and a drive circuit for controlling a rotation speed of the motor. The input connector passes through an opening formed through a wall of a housing of the compressor, whereby the input connector is secured to the wall. The drive circuit controls the rotation speed of the motor and comprises an output connector that is connected to the input connector to secure the drive circuit to the wall.

In yet another embodiment of the invention, a method of assembling a motor-driven compressor comprises the steps of forming an opening through a wall of a compressor housing; passing an input terminal of a compressor motor through the opening, such that the input terminal is secured to the wall; and connecting an output terminal of a drive circuit of the motor directly to the input terminal.

Other objects, features, and advantages of this invention will be apparent to and understood by persons of ordinary skill in the art from the following description of preferred embodiments of the invention with reference to the accompanying drawings.

BRIEF DESCRIPTION OF DRAWINGS

The invention may be more completely understood by reference to the following figures.

FIG. 2b is a sectional view taken along line 2B—2B of FIG. 2a.

DETAILED DESCRIPTION OF PREFERRED EMBODIMENTS

Figure 1:
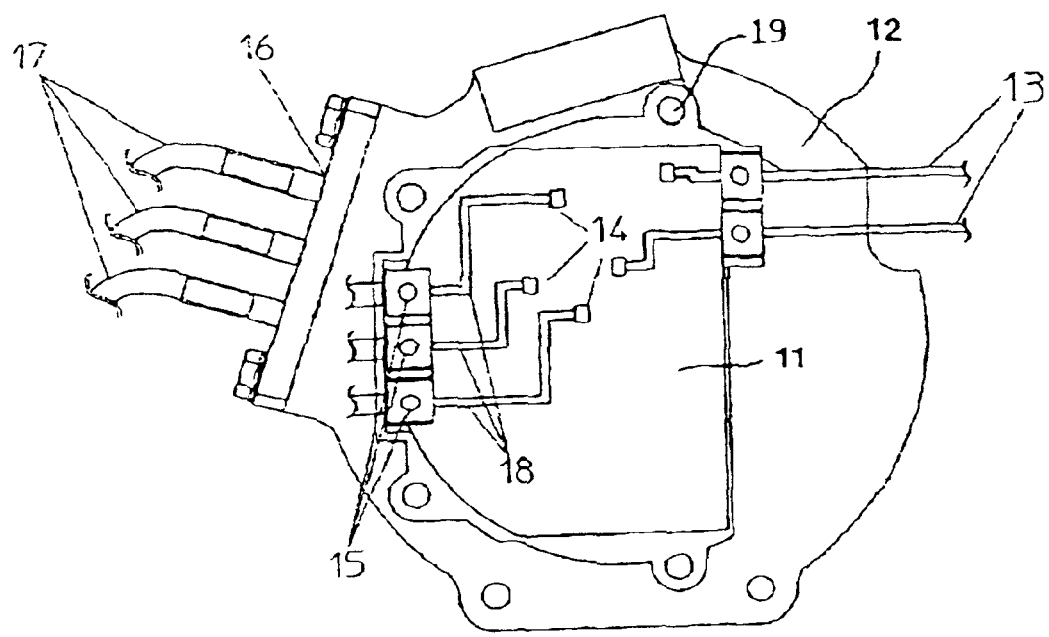
FIG. 1 is a view of a drive circuit positioned on a housing of a known motor-driven compressor.
Figure 2A:
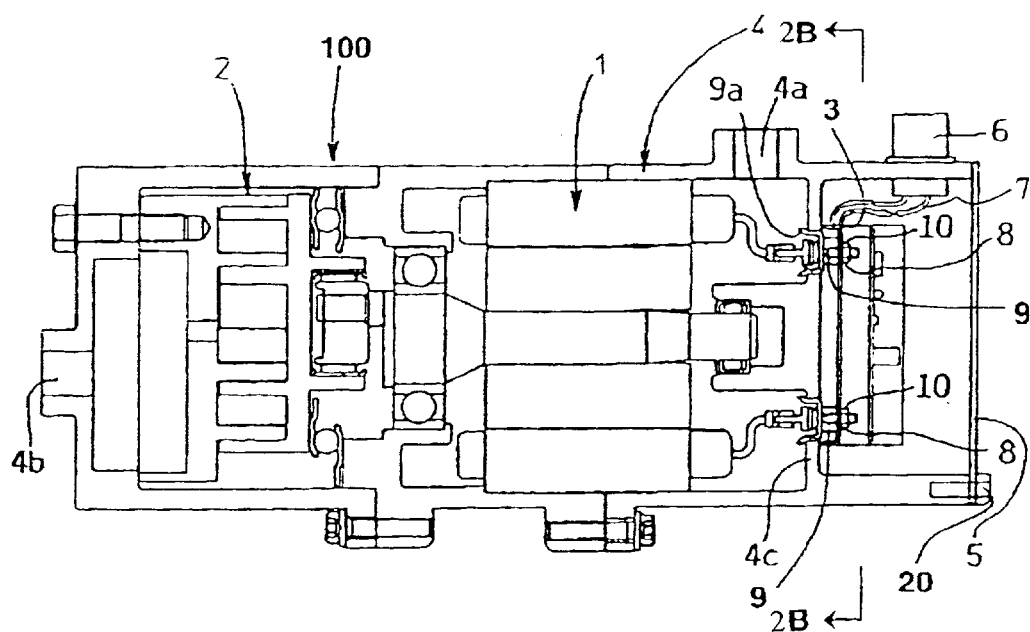
FIG. 2a is a longitudinal, cross-sectional view of a motor-driven compressor according to an embodiment of the present invention.
Figure 2B:
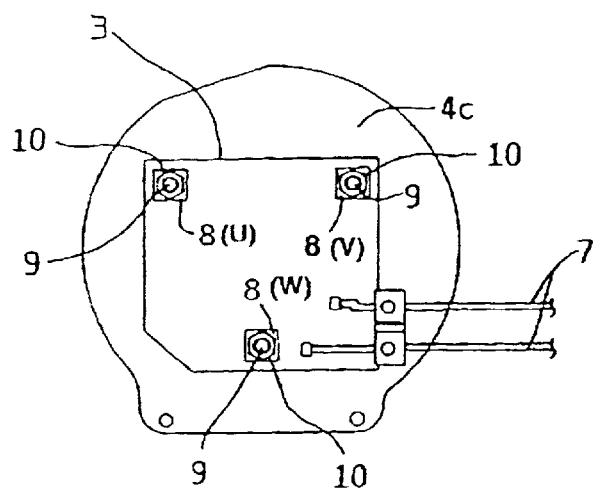

Referring to FIGS. 2a and 2b, a motor-driven compressor of an embodiment of the present invention is shown. A motor-driven compressor 100 has a housing 4, a three-phase synchronous motor 1, a compression portion 2, e.g., a scroll-type compression portion, and a drive circuit including an inverter 3. An inlet port 4a and a discharge port 4b are formed through housing 4. Three-phase synchronous motor 1 and compression portion 2 are positioned within housing 4. Housing 4 includes a partition wall 4c positioned within housing 4 between motor 1 and the drive circuit including the inverter 3, as shown in FIG. 2a. Moreover, one side of partition wall 4c forms a portion of a refrigerant suction route within housing 4. The drive circuit is secured to the other side of partition wall 4c, as is described in greater detail hereinafter. Housing 4 also includes an opening through which the drive circuit may be accessed. The opening is covered by a lid 5, which is secured at an axial end of housing 4 by a plurality of bolts 20. Thus, the drive circuit is positioned within housing 4 between partition wall 4c and lid 5.

An electric current is supplied to inverter 3 of the drive circuit via connector 6, which is positioned on an outer surface of suction housing 4 adjacent to a side edge of lid 5. A plurality of cables 7 connects inverter 3 and connector 6 so that electric current may be supplied to inverter 3. A plurality of output connectors, e.g., output terminals 8, each of which corresponds to a phase of motor 1, is positioned along an outer edge of a board of inverter 3. Input connectors of motor 1, e.g., input terminals 9, correspond to respective phases of motor 1. Further, input terminals 9 include a bolt-shaped portion and a collar portion 9a. Moreover, each input terminal 9 passes through an opening in partition wall 4c, such that the bolt-shaped portion of each input terminal 9 extends beyond partition wall 4c. In addition, each input terminal 9 passes through a respective output terminal 8. Each output terminal 8, which corresponds to a respective phase of motor 1, e.g., U, V, W, is fastened directly to an input terminal 9, each of which has a respective phase, e.g., U, V, W, by a fastener, e.g., a nut 10. Fastening nut 10 secures each output terminal 8 directly to a respective input terminal 9. Consequently, the drive circuit including inverter 3 is fixed to a side surface of partition wall 4c, e.g., to a side surface of partition wall 4c opposite to a side surface of partition wall 4c that forms a portion of a refrigerant suction route within housing 4. Moreover, each of the openings formed through partition wall 4c is closed, e.g., covered by collar portion 9a of an input terminal 9, such that input terminals 9 are secured to partition wall 4c.

In operation of motor-driven compressor 100, three-phase synchronous motor 1 is driven by a three-phase electric current supplied by the drive circuit including the inverter 3, and compression portion 2 is rotated by motor 1. A refrigerant is drawn into housing 4 through inlet port 4a. The refrigerant is compressed at compression portion 2, and is discharged from housing 4 through discharge port 4b.

In motor-driven compressor 100, because each output terminal 8 of the drive circuit is connected directly to a respective input terminal 9 of motor 1, the use of wires to connect output terminals 8 and input terminals 9 is no longer necessary. Therefore, electric power loss of motor-driven compressor 100, e.g., through wire connections between respective input terminals and output terminals, may be reduced compared with known motor-driven compressors. Further, the number of components of motor-driven compressor 100 also may be reduced compared with known motor-driven compressors. Moreover, the direct connection of output terminals 8 and input terminals 9 via a fastener, e.g., nut 10, secures the drive circuit including inverter 3 to the side surface of partition wall 4c and eliminates the need for additional fasteners. As a result, the components used to secure inverter 3 to partition wall 4c in known compressors are no longer necessary, and the number of components of motor-driven compressor 100 may be reduced further compared with known motor-driven compressors. Further, in motor-driven compressor 100, the three output terminals 8 of the drive circuit including the inverter 3 are positioned along an outer edge of a board of inverter 3 to secure inverter 3 more stably to the side surface of partition wall 4c than in known motor-driven compressors.

Moreover, the present invention is not limited to motor-driven compressors having a three-phase synchronous motor. The present invention may be applied to motor-driven compressors having different types of three-phase motors, e.g., a three-phase induction motor. In addition, the present invention may be applied to motor-driven compressors having a motor other than a three-phase motor, e.g., a single-phase type motor, a two-phase type motor, or a polyphase type motor.

As described above, in a motor-driven compressor with respect to embodiments of the present invention, because an output terminal of a drive circuit including an inverter is fastened directly to an input terminal of a motor, a wire connection between the output terminal and the input terminal is no longer necessary. Therefore, power loss of the motor-driven compressor of the present invention may be reduced compared with known motor-driven compressors, and the number of components of the motor-driven compressor of the present invention also may be reduced compared with known motor-driven compressors. Moreover, because the drive circuit including an inverter is fixed on a side surface of a partition wall by the output terminal being fastened to the input terminal, e.g., via a nut, the components designated for securing the inverter to the partition wall in known motor-driven compressors are no longer necessary. As a result, the number of components of the motor-driven compressor may be reduced further compared with known motor-driven compressors.

A method of assembling a motor-driven compressor according to the present invention includes forming one or more openings through a partition wall 4c of a compressor housing. Each of a plurality of input terminals 9 of a motor 1 of the motor-driven compressor is passed through a respective opening in partition wall 4c. Moreover, input terminals 9 are positioned through each opening, such that input terminals 9 are secured to partition wall 4c and such that a bolt-shaped portion of each input terminal 9 extends beyond the wall 4c. A drive circuit including an inverter 3 of the motor-driven compressor is positioned on a side surface of partition wall 4c. Further, each of a plurality of output terminals 8 of the drive circuit is connected directly to a respective one of each input terminal 9, thereby securing the drive circuit to the wall 4c. Moreover, each output terminal 8 of the drive circuit may be connected to a respective input terminal 9 by a fastener, e.g., a nut 10.

Although the present invention has been described in detail in connection with preferred embodiments, the invention is not limited thereto. It will be understood by those skilled in the art that other embodiments, variations, and modifications of the invention will be apparent to those skilled in the art from a consideration of this specification or practice of the invention disclosed herein, and may be made within the scope and spirit of this invention, as defined by the following claims.

What is claimed is:

1. A motor-driven compressor including a motor and a compression portion for compressing a refrigerant, said motor-driven compressor comprising:

an input terminal for said motor, said input terminal passing through an opening formed through a wall of a refrigerant suction route, whereby said input terminal is secured to said wall and extends beyond said wall; and a drive circuit for controlling a rotation speed of said motor and having an output connector, wherein said output connector of said drive circuit is connected directly to said input terminal, thereby securing said drive circuit to said wall.

2. The motor-driven compressor of claim 1, wherein said motor is a three-phase synchronous motor, and wherein said output connector comprises a plurality of output terminals for each phase of said motor, said plurality of output terminals being positioned separately around an outer edge of a board of said drive circuit.

3. A motor-driven compressor comprising:

an input connector for a motor, wherein said input connector passes through an opening formed through a wall of a housing of said compressor, whereby said input connector is secured to said wall; and a drive circuit for controlling a rotation speed of said motor, wherein said drive circuit comprises an output connector, said output connector being connected to said input connector to secure said drive circuit to said wall.

4. The motor-driven compressor of claim 3, wherein said input connector comprises a plurality of input terminals.

5. The motor-driven compressor of claim 3, wherein said output connector comprises a plurality of output terminals, said output terminals being positioned along an outer edge of a board of an inverter of said drive circuit.

6. The motor-driven compressor of claim 3, wherein said output connector is connected directly to said input connector by a fastener.

7. The motor-driven compressor of claim 3, wherein said input connector comprises a collar.

8. The motor-driven compressor of claim 7, wherein said collar secures said input connector in said opening.

9. The motor-driven compressor of claim 3, wherein said wall is positioned adjacent to a refrigerant inlet port.

10. The motor-driven compressor of claim 3, wherein said input connector passes through said opening of said wall, such that a portion of said input connector extends beyond said wall.

11. A method of assembling a motor-driven compressor comprising the steps of:

forming an opening through a wall of a compressor housing;

passing an input terminal of a compressor motor through said opening, such that said input terminal is secured to said wall; and connecting an output terminal of a drive circuit of said motor directly to said input terminal.

12. The method of claim 11, wherein the step of passing an input terminal through said opening comprises the step of passing an input terminal through said opening, such that a portion of said input terminal extends beyond said wall.

13. The method of claim 11, wherein the step of connecting an output terminal of a drive circuit of said motor directly to said input terminal comprises the step of connecting said output terminal to said input terminal with a fastener.

14. The method of claim 11, wherein the step of forming an opening through a wall of a compressor housing comprises the step of forming a plurality of openings through a wall of a compressor housing.

15. The method of claim 14, wherein the step of passing an input terminal of a compressor motor through said opening comprises the step of passing an input terminal through each of said plurality of openings.

16. The method of claim 11, further comprising the steps of:

forming a plurality of openings through a wall of a compressor housing;

passing an input terminal through each of said plurality of openings, such that each of said input terminals is secured to said wall; and connecting each of said output terminals directly to a respective one of said input terminals.

17. The method of claim 11, wherein the step of connecting an output terminal of a drive circuit of said motor directly to said input terminal secures said drive circuit to said wall.

* * * * *